United States Patent [19]

Nakamura et al.

[11] Patent Number: 5,303,798
[45] Date of Patent: Apr. 19, 1994

[54] MOUNTING ARRANGEMENT FOR AUTOMOTIVE ENGINE WITH LONGITUDINALLY ARRANGED CYLINDERS

[75] Inventors: Kazumi Nakamura; Saburo Yamasaki, both of Isehara; Hitoshi Kokubun, Atsugi, all of Japan

[73] Assignee: Nissan Motor Co., Ltd., Yokohama, Japan

[21] Appl. No.: 887,748

[22] Filed: May 26, 1992

[30] Foreign Application Priority Data

May 24, 1991 [JP] Japan .................. 3-148095

[51] Int. Cl.⁵ ................................ B60K 5/12
[52] U.S. Cl. ...................... 180/292; 180/300
[58] Field of Search ............ 180/292, 297, 300, 291, 180/293; 248/638, 637

[56] References Cited

U.S. PATENT DOCUMENTS

| | | | |
|---|---|---|---|
| 1,802,191 | 4/1931 | Wright | 180/292 X |
| 1,947,213 | 2/1934 | Meyer | 180/292 |
| 3,213,958 | 10/1965 | Muller | 180/292 X |
| 3,547,214 | 12/1970 | Ravenel | 180/292 |
| 3,889,771 | 6/1975 | Kronogard | 180/297 X |
| 4,667,767 | 5/1987 | Shea et al. | 180/247 |
| 5,014,812 | 5/1991 | Kazama | 180/292 |
| 5,062,822 | 11/1991 | Nakayama et al. | 475/200 |

FOREIGN PATENT DOCUMENTS

| | | |
|---|---|---|
| 383998 | 2/1987 | Austria . |
| 0347260 | 12/1989 | European Pat. Off. . |
| 3604144 | 8/1986 | Fed. Rep. of Germany . |
| 3920638 | 12/1989 | Fed. Rep. of Germany . |
| 4-108037 | 4/1982 | Japan . |

*Primary Examiner*—Margaret A. Focarino
*Assistant Examiner*—Michael Mar
*Attorney, Agent, or Firm*—Foley & Lardner

[57] ABSTRACT

In a mounting, arrangement for an internal combustion engine with at least one row of cylinders arranged in a longitudinal direction of a four-wheel drive or a front-wheel drive automotive vehicle, which employs a front-wheel drive shaft and a front differential connected to the front-wheel drive shaft, the front-wheel drive shaft and the front differential are both arranged at the side of the engine in the vicinity of the front end of the engine block, and engine mounts for mounting the engine, are arranged rearwardly of the front-wheel drive shaft, so as to assure a shorter entire length and a shorter entire width of the power plant and to provide an optimal car weight balance between front and rear wheels.

3 Claims, 6 Drawing Sheets

MOUNTING ARRANGEMENT FOR AUTOMOTIVE ENGINE WITH LONGITUDINALLY ARRANGED CYLINDERS

BACKGROUND OF THE INVENTION

1. Field of the Invention

The present invention relates to a mounting arrangement for an automotive engine with at least one row of cylinders arranged in a longitudinal direction of the vehicular body, and specifically to a mounting arrangement for an automotive engine with a longitudinal arrangement of cylinders, which is suitable for a front-wheel drive vehicle or a four-wheel drive vehicle.

2. Description of the Prior Art

As is generally known, there are two engine arrangements, one being an arrangement for an engine with cylinders arranged in a longitudinal direction of the vehicle, and the other being an arrangement for an engine with cylinders arranged in a lateral direction of the vehicle. The longitudinal arrangement for the engine is advantageous due to more maintenance space defined at both sides of the longitudinally arranged engine. However, this longitudinal arrangement results in a relatively long over-all length of the engine in the longitudinal direction of the vehicle and consequently a relatively large front overhang. For this reason, such a longitudinal arrangement would be unsuitable for a front-wheel drive vehicle or a four-wheel drive vehicle, wherein a front-wheel drive unit as well as the engine are provided in the engine room.

Recently, there have been proposed and developed various four-wheel drive vehicles employing a V-type engine, such as a V-6 engine or a V-8 engine. The V-type engine is advantageous to provide a shorter entire length of the power plant or engine, when compared with an in-line engine. In general, the V-type engine permits a relatively short front overhang. Therefore, such a V-type engine would be widely applied for four-wheel drive vehicles. Assuming that the V-type engine is applied for a four-wheel drive vehicle or a front-wheel drive vehicle, there are three traditional engine mounting arrangements respectively shown in FIGS. 1, 2 and 3. For instance, Japanese Patent First Publication Tokkai (Heisei) 4-108037 (corresponding to Japanese Patent Application No. 2-224581) discloses an engine mounting arrangement similar to that of FIGS. 1, 2 or 3.

For the purpose of simplification of description, the same reference numerals used in the conventional engine mounting arrangement shown in FIG. 1 will be applied to the corresponding elements used in the other conventional engine mounting arrangements shown in FIGS. 2 and 3 and also applied to the corresponding elements used in a preferred embodiment of an improved engine mounting arrangement shown in FIGS. 4, 5 and 6, hereinbelow described in detail.

Referring now to FIG. 1, there is shown a first exemplified prior art mounting arrangement for a V-type engine. The engine mounting arrangement is determined depending on a relative position relationship among a power plant or an engine body 1 of an automotive internal combustion engine, a power train, which includes a transmission 2 (or a torque converter housing), a front differential 3, a companion flange 4, a front-wheel drive shaft 5, a propeller shaft 6, and so on, and engine-body accessories, which include a power-steering pump 7, a compressor 8 for an air conditioner, a starter motor 9, and so forth, and other parts, for example engine mounts 10, a steering rack unit 11, a steering gear 12, and so on. The first exemplified engine mounting arrangement shown in FIG. 1 is characterized in that the front differential 3 is considerably offset from the side wall of the engine 1, so as to prevent a front flange 2a of the transmission 2, which is mounted on the rear end of the engine block, from interfering with the rear end 3a of the front differential 3 and with a connecting portion 6a between the front differential 3 and the propeller shaft 6. As appreciated from the offsetting front differential 3 shown in FIG. 1, the entire width W of the engine room is increased, thereby reducing the advantage of the previously noted longitudinal arrangement for the engine. According to the first engine arrangement of FIG. 1, since the engine mounts 10 are arranged in front of the front differential 3 and in addition the engine-body accessories, such as the power-steering pump 7 and the compressor 8, are further arranged in front of the engine mounts 10, the first engine arrangement is disadvantageous to provide a shorter entire length L of the power plant.

Referring now to FIG. 2, there is shown a second exemplified prior art mounting arrangement for a V-type engine. The second exemplified engine mounting arrangement shown in FIG. 2 is characterized in that the rear end of the engine crankshaft is longitudinally extended by a designated length of extension 1a, so as to avoid the previously noted interference between the front flange 2a and the rear end 3a of the front differential 3 or the connecting portion 6a. The second engine arrangement is also disadvantageous to provide a shorter entire length L of the power plant.

Referring now to FIG. 3, there is shown a third exemplified prior art mounting arrangement for a V-type engine. The third exemplified engine mounting arrangement shown in FIG. 3 is characterized in that the front differential 3 is characterized in that the front differential 3 is arranged in a more forward position than the mounting position of the differential 3 shown in FIG. 1 or FIG. 2 and as a result the engine-body accessories, such as the power-steering pump 7 and the compressor 8 are relocated from the engine body to the other auxiliary driving unit (not shown). The third engine arrangement permits both a shorter entire length L and a shorter entire width W. However, the third engine arrangement requires an auxiliary drive unit for driving the above-mentioned engine-body accessories. This results in an increase in total cost of the vehicle.

SUMMARY OF THE INVENTION

It is therefore, in view of the above disadvantages, an object of the present invention to provide a mounting arrangement for an automotive engine with at least one row of cylinders arranged in a longitudinal direction of the vehicle body, which can be optimally applied for a four-wheel drive vehicle or a front-wheel drive vehicle without increasing total manufacturing cost, while keeping both a shorter entire length and a shorter entire width of the power plant.

It is another object of the invention to provide a mounting arrangement for an automotive engine with at least one row of cylinders arranged in a longitudinal direction of the vehicle body, which can prevent a front heavy tendency and provide an optimal car weight balance between front and rear wheels.

In order to accomplish the aforementioned and other objects, a mounting arrangement for an internal combustion engine with at least one row of cylinders arranged in a longitudinal direction of a four-wheel drive or a front-wheel drive automotive vehicle, which employs a front-wheel drive shaft and a front differential connected to said front-wheel drive shaft, is characterized in that the front-wheel drive shaft and the front differential are both arranged at the side of the engine in the vicinity of the front end of the engine body, and in addition engine mounts mounting the engine, are arranged rearwardly of the front-wheel drive shaft.

According to another aspect of the invention, a mounting arrangement for an internal combustion engine with at least one row of cylinders arranged in a longitudinal direction of a four-wheel drive or a front-wheel drive automotive vehicle, which employs a front-wheel drive shaft and a front differential connected to the front-wheel drive shaft, is characterized in that the front-wheel drive shaft and the front differential are both arranged at the side of the engine in the vicinity of the front end of the engine body, engine-body accessories, attached to the engine body, are arranged in front of the front-wheel drive shaft, and engine mounts mounting the engine, are arranged rearwardly of the front-wheel drive shaft. It is preferable that one of the engine-body accessories is arranged substantially upwardly of the front differential. The engine-body accessories include a power-steering pump unit, an alternator, and a compressor for an automotive air conditioner, each having a driven connection with an engine crankshaft.

DESCRIPTION OF THE PREFERRED EMBODIMENTS

Figure 4:
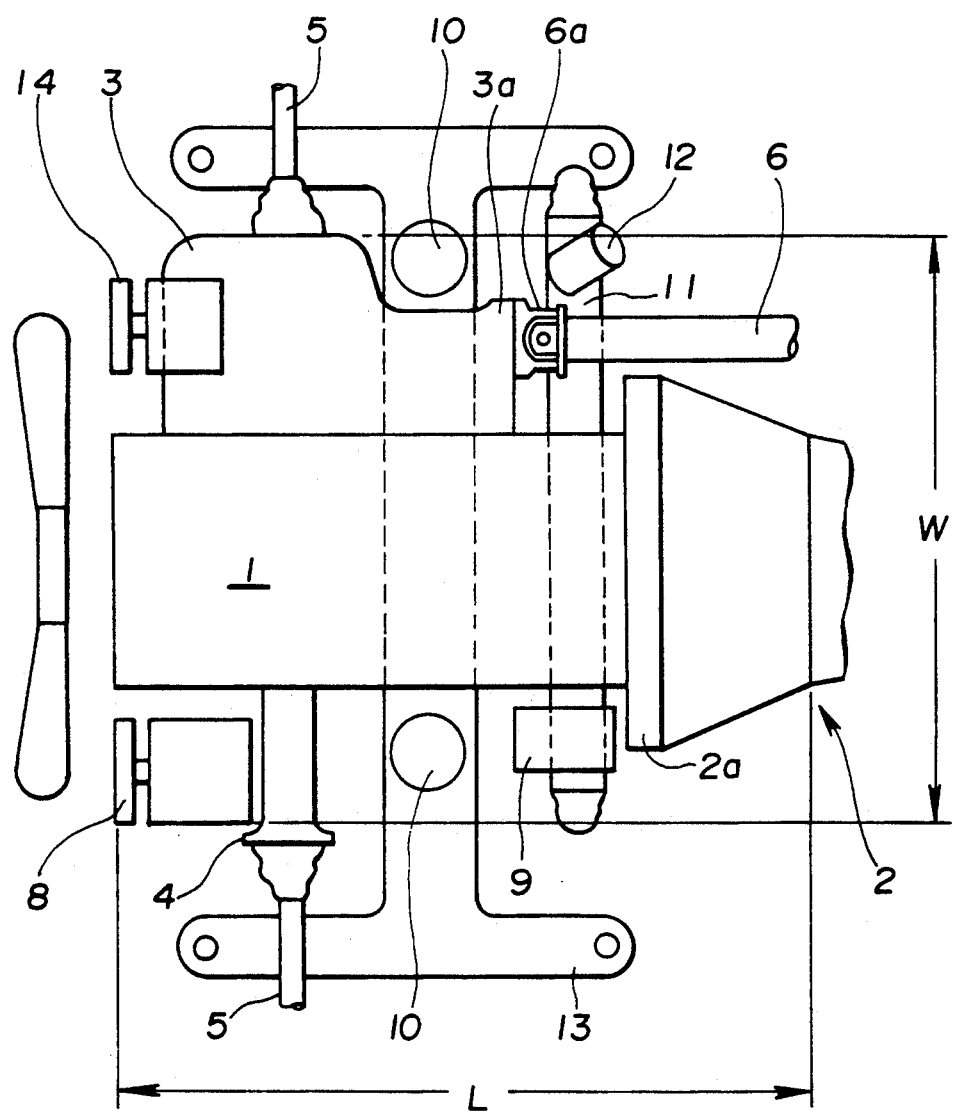
FIG. 4 is a plan view illustrating an engine mounting arrangement of the preferred embodiment according to the invention.
Figure 5:
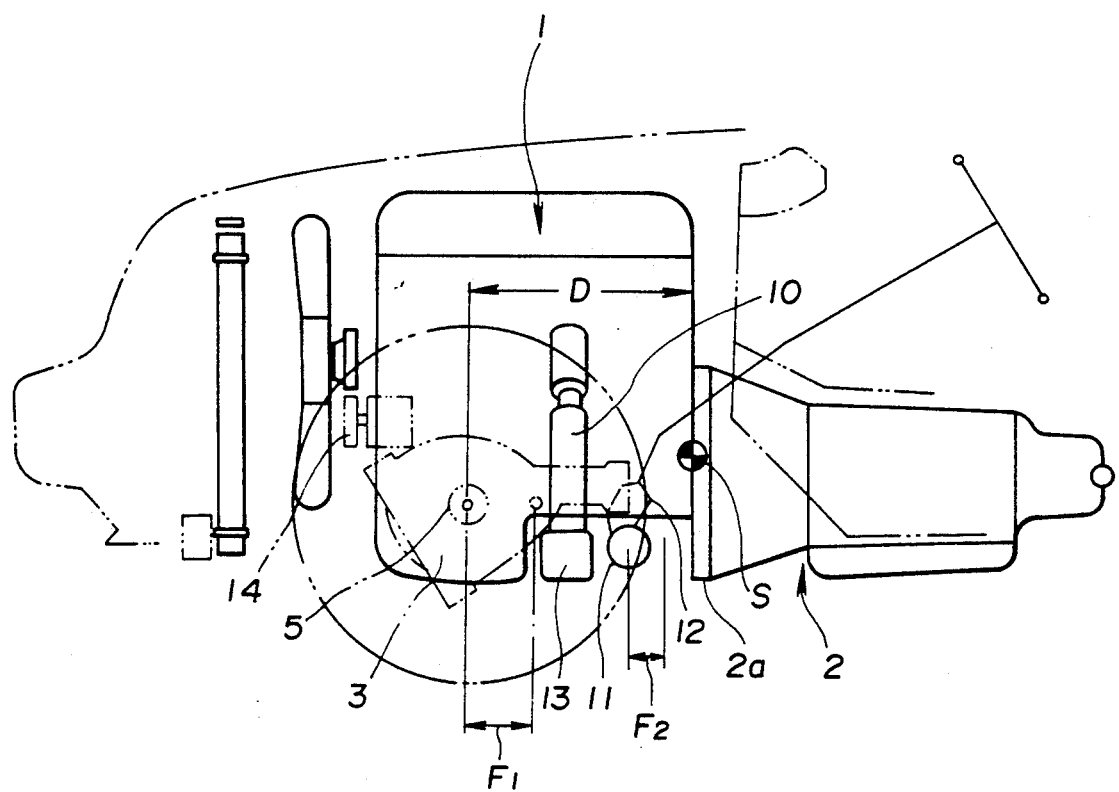
FIG. 5 is a side view illustrating the engine mounting arrangement of the embodiment shown in FIG. 4.
Figure 6:
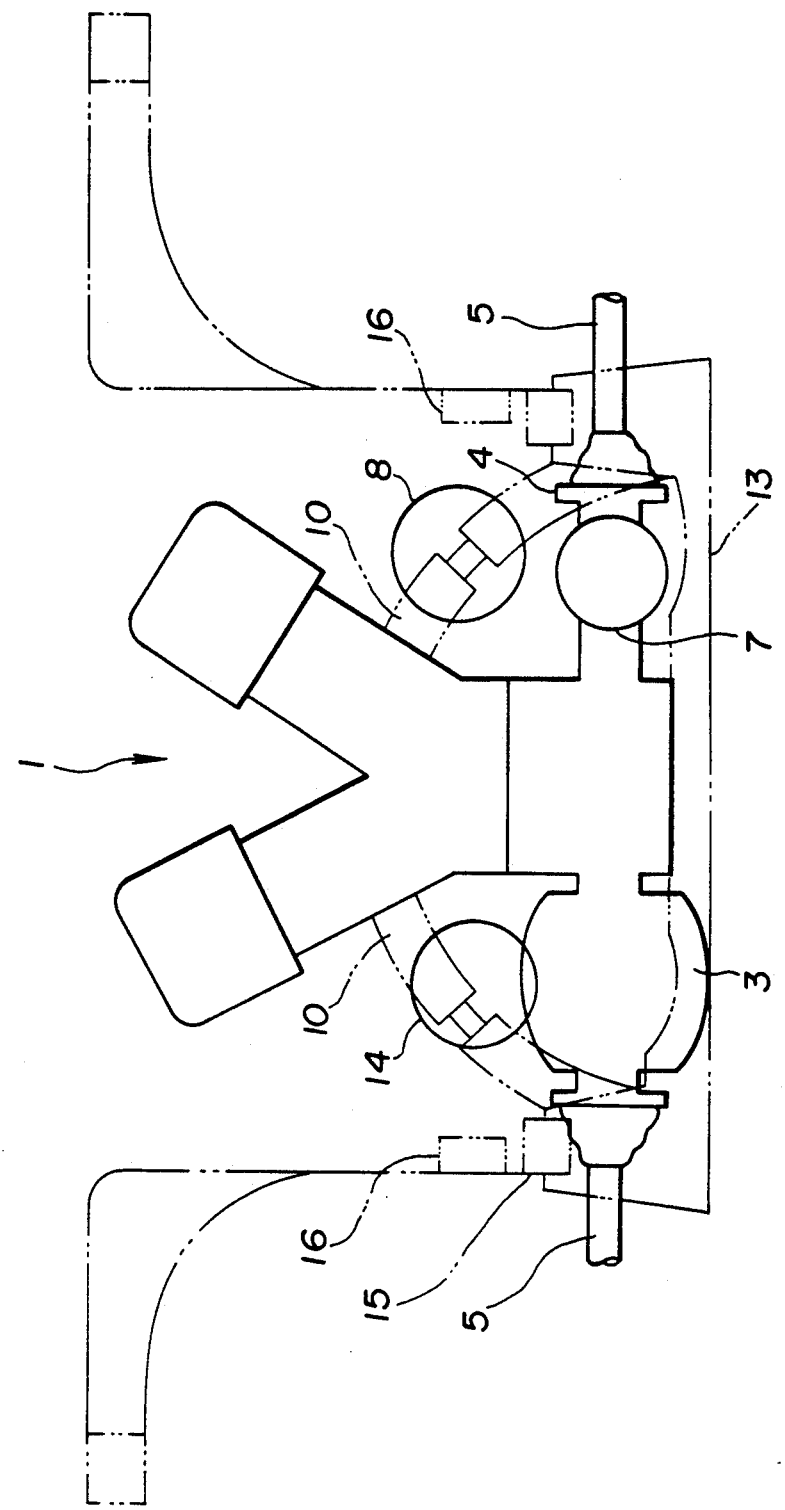
FIG. 6 is a front view illustrating the engine mounting arrangement of the embodiment shown in FIGS. 4 and 5.

Referring now to FIGS. 4, 5 and 6, there is shown an improved engine mounting arrangement of the embodiment according to the invention, which is applied for a four-wheel drive vehicle employing a V-6 engine. As shown in FIG. 5, both the front differential 3 and the front-wheel drive shaft 5 are offset by a distance $F_1$ in a more forward position than a standard or usual mounting position of the drive shaft 5. Due to offsetting of the differential 3 and the drive shaft 5, the steering rack unit 11 is also offset by the distance $F_2$ in a more forward position than a usual position thereof. The engine mounts 10 are mounted on a suspension member 13, which is arranged rearwardly of the front-wheel drive shaft 5, based on the above-noted offsetting of the differential 3 and the drive shaft 5. As shown in FIG. 4, the engine-body accessories, such as the compressor 8 for the automotive air conditioner and the alternator 14, are retained in usual positions, in front of the front-wheel drive shaft 5. The above-exemplified accessories have a driven connection with the engine crankshaft. As seen in FIG. 6, the power-steering pump unit 7 is arranged below of the compressor 8. In FIG. 6, reference numerals 15 and 16 respectively denote a mounting member for mounting the suspension member 13 on the vehicle body and a front side member.

As set forth above, since both the front differential 3 and the front-wheel drive shaft 5 are arranged to be offset by the distance $F_1$ in a more forward position than the usual position, such an arrangement reliably prevents the previously noted interference between the front flange 2a of the transmission 2 and the rear end 3a of the front differential 3 and between the front flange 2a and the connecting portion 6a of the propeller shaft 6. As appreciated from the above, the engine mounting arrangement of the embodiment permits a shorter entire length L and a shorter entire width W of the power plant 1, without offsetting the front differential 3 outside of the side wall of the engine and without longitudinally extending the rear end of the engine crankshaft.

Figure 1:
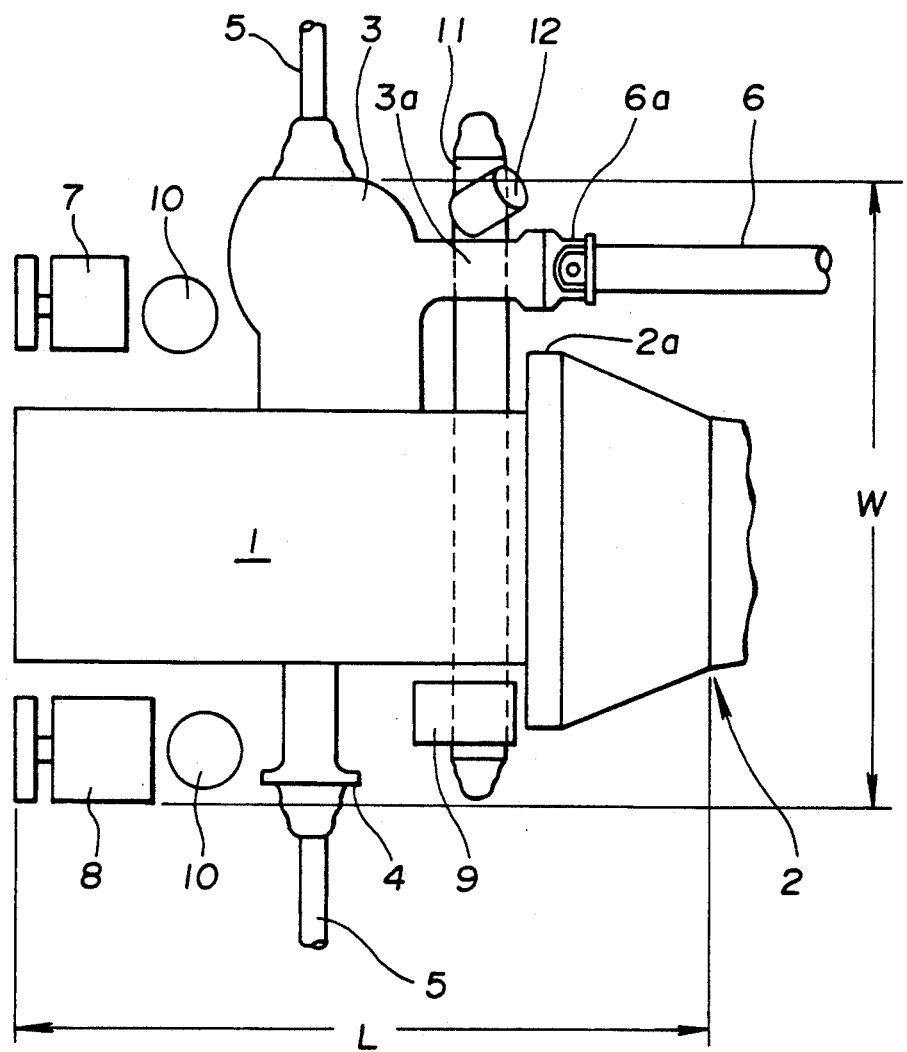
FIGS. 1 to 3 are plan views illustrating three conventional mounting arrangements for a V-type engine.
Figure 2:
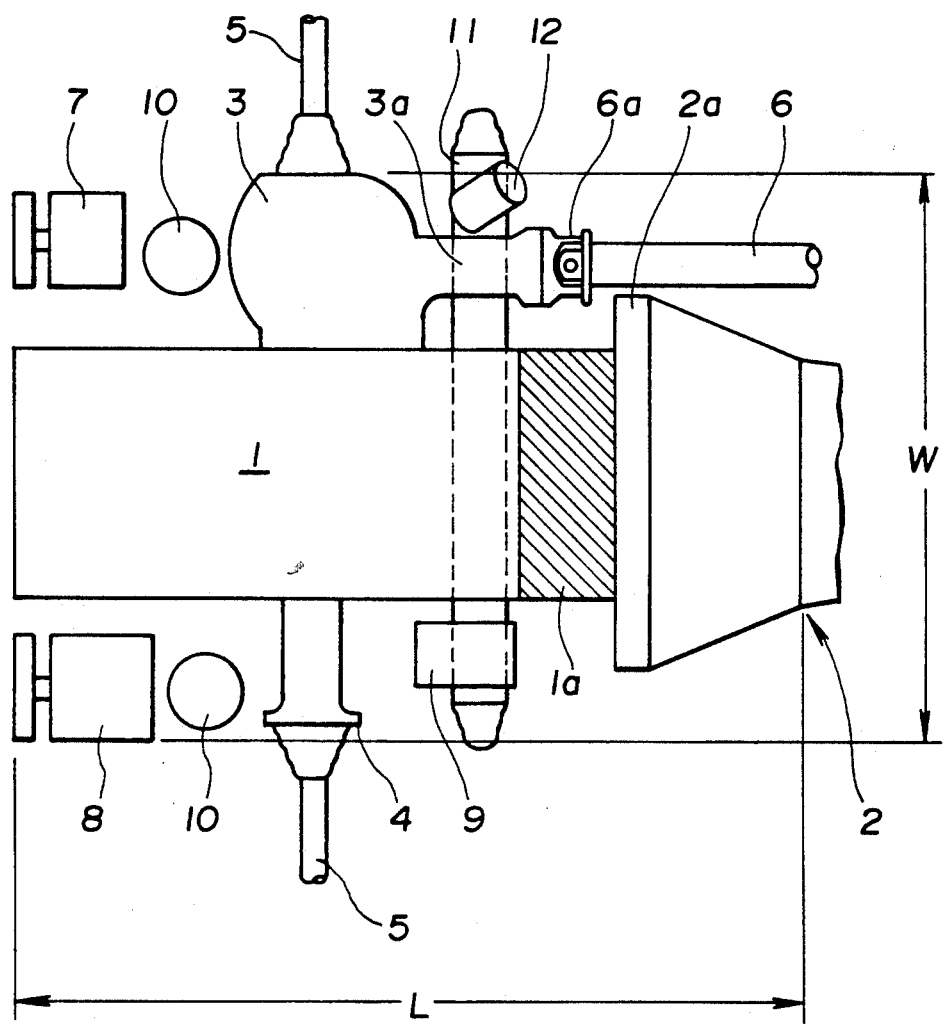
Figure 3:
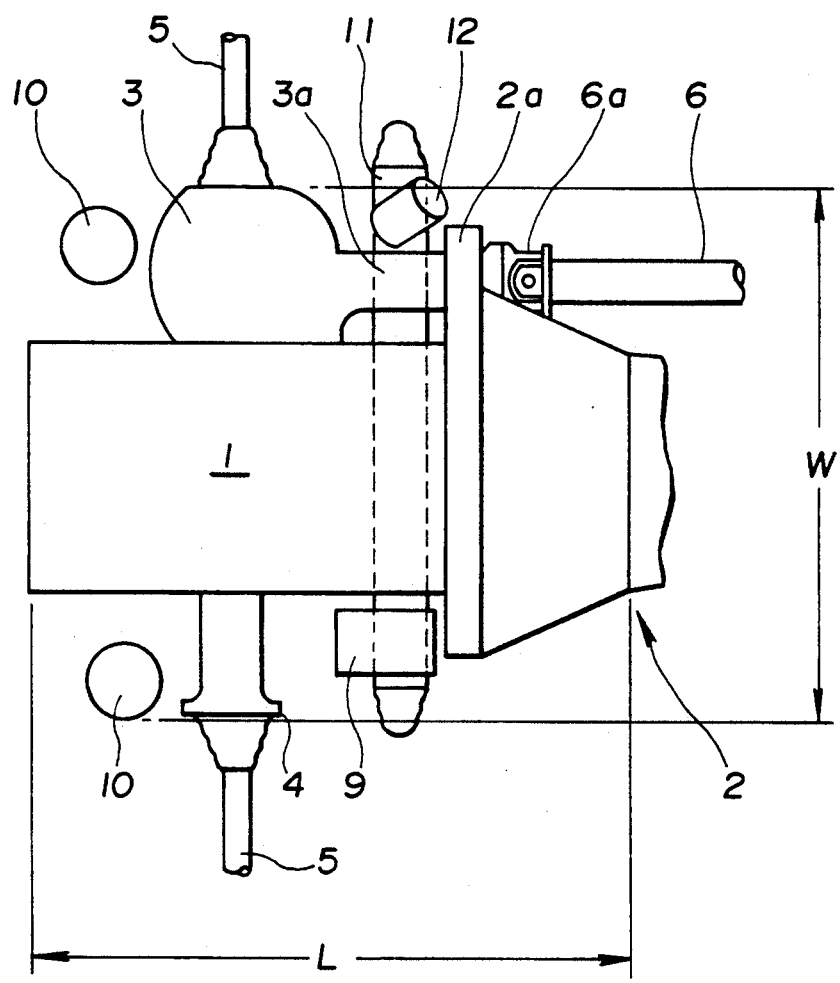

As shown in FIGS. 5 and 6, since the front differential 3 is usually disposed below the engine mounts 10, the alternator 14 can be arranged substantially upwardly of the front differential 3 rather than just in front of the front differential 3. As set forth above, the engine mounting arrangement of the embodiment is considerably advantageous to reduce the entire length L of the power plant. In the conventional engine mounting arrangements shown in FIGS. 1 and 2, such an alternator arrangement is difficult, since the engine mounts 10 are arranged in front of the front-wheel drive shaft 5 and the front differential 3.

According to the embodiment, since the power plant 1 is arranged rearward in relation to the front-wheel drive shaft 5, a longitudinal distance D between the front-wheel drive shaft 5 and a center-of-gravity S of the engine weight can be sot to a relatively large value, in comparison with a usual distance obtained in a usual front differential arrangement. This prevents a front heavy tendency. Therefore, the engine mounting arrangement according to the invention may provide an optimal car weight balance between front and rear wheels. Due to the frontward arrangement of the front-wheel drive shaft, the wheelbase is increased and as a result the riding comfort of the vehicle is improved.

Moreover, in the embodiment, since the engine mounts 10 are not arranged in front of the front-wheel drive shaft 5 but rearwardly of the drive shaft 5, and only the engine-body accessories including the alternator 14, the compressor 8, and the power-steering pump unit 7 are arranged in front of the front-wheel drive shaft 5, such an arrangement assures a relatively large space for the engine mounts 10, even in a limited space in the engine room. As appreciated from the above, since the engine mount having a high rigidity can be disposed in such a relatively large engine mount space, without introducing interference between the engine mount 10 and other parts, the mounting rigidity for the engine may be enhanced.

In the preferred embodiment, although the engine mounting arrangement according to the invention is applied a four-wheel drive vehicle employing a V-6 engine, such an engine mounting arrangement may be applied a front-wheel drive vehicle employing a front differential and a front-wheel drive shaft, and may be applied to a four-wheel drive or front-wheel drive vehicle employing an automotive engine with at least one row of cylinders arranged in a longitudinal direction of the vehicular body, including V-type engines, in-line engines, or the like.

While the foregoing is a description of the preferred embodiments for carrying out the invention, it will be understood that the invention is not limited to the particular embodiment shown and described herein, but may include variations and modifications without departing from the scope or spirit of this invention as described by the following claims.

What is claimed is:

1. A mounting arrangement for an internal combustion engine with at least one row of cylinders arranged in a longitudinal direction of a four-wheel drive or a front-wheel drive automotive vehicle, which employs a front-wheel drive shaft and a front differential connected to said front-wheel drive shaft, comprising:

engine-body accessories attached to the engine and arranged in front of said front-wheel drive shaft;
   a pair of transversely opposed engine mounts for mounting the engine, the engine mounts being arranged rearwardly of said front-wheel drive shaft; and
   a suspension member having a high rigidity and on which said engine mounts are supported so that the engine mounts are closer to a bottom of the engine;
   wherein said front-wheel drive shaft and said front differential are both arranged at a side of the engine in a vicinity of a front end of said engine and wherein at least one of said engine-body accessories is arranged substantially above said front differential.

2. The automotive engine mounting arrangement as set forth in claim 1, wherein
   said engine-body accessories include a power-steering pump unit, an alternator, and a compressor for an automotive air conditioner, each having a driven connection with an engine crankshaft.

3. A mounting arrangement for an internal combustion engine with at least one row of cylinders arranged in a longitudinal direction of a four-wheel drive or a front-wheel drive automotive vehicle, comprising:

a front-wheel drive shaft;
   a front differential connected to said front-wheel drive shaft;
   engine-body accessories attached to the engine and arranged in front of said front-wheel drive shaft;
   a pair of transversely opposed engine mounts for mounting the engine arranged rearwardly of said front-wheel drive shaft;
   a high rigidity suspension member on which said engine mounts are supported such that said engine mounts are arranged closer to a bottom of the engine; and
   wherein said front-wheel drive shaft and said front differential are both arranged at a side of the engine in a vicinity of a front end of said engine and wherein at least one of said engine-body accessories is arranged substantially above said front differential.

* * * * *